United States Patent [19]
Makineni

[11] Patent Number: 5,696,711
[45] Date of Patent: Dec. 9, 1997

[54] APPARATUS AND METHOD FOR PERFORMING VARIABLE PRECISION FLOATING POINT ROUNDING OPERATIONS

[75] Inventor: Sivakumar Makineni, Sunnyvale, Calif.

[73] Assignee: Intel Corporation, Santa Clara, Calif.

[21] Appl. No.: 577,726

[22] Filed: Dec. 22, 1995

[51] Int. Cl.[6] .................................................... G06F 7/38
[52] U.S. Cl. ......................................................... 364/748.03
[58] Field of Search ................................. 364/765, 748, 364/715.04

[56] References Cited

U.S. PATENT DOCUMENTS 5,511,016  4/1996  Be'chade ........................... 364/745

Primary Examiner—Tan V. Mai
Attorney, Agent, or Firm—Blakely, Sokoloff, Taylor & Zafman

[57] ABSTRACT

An apparatus and method for performing variable precision floating point rounding operations is provided that accomplishes rounding of a number that is faster, less complex and requires less hardware than conventional devices. The apparatus and method provides for a single uniform incrementer located at the zero position that can add a logic 1 to that position. After the Round, Guard and Sticky bits are produced, logic 1s are inserted in the bit positions to the right of the significant bits of the result with a check unit. The check unit then outputs the intermediate result to an incrementer and a zero-out unit. The incrementer adds a 1 to the zero position and the carry function of the incrementer by operation ripples through the series of 1s up to the rightmost position of the resultant mantissa leaving a trail of zeroes behind producing a first output. Finally, a multiplexer is provided to choose between the first output and the second output as the final result.

20 Claims, 4 Drawing Sheets

APPARATUS AND METHOD FOR PERFORMING VARIABLE PRECISION FLOATING POINT ROUNDING OPERATIONS

BACKGROUND OF THE INVENTION

1. Field of the Invention

The present invention relates generally to data processing systems and, more particularly, to variable precision floating point rounding computations.

2. Description of Related Art

In floating point arithmetic operations in a floating point unit, numbers are distinguished by their mantissa (M) and their exponent (E). For example, number 1234.56 would be specified by $1.23456 \times 10^3$, where M=123456 and E=3. In a floating point arithmetic operation, the number of bits in the resultant mantissa may exceed the number of mantissa bits corresponding to the precision of the destination format. For example, when multiplying two double-extended precision numbers, each by definition having 64-bit mantissas, the product is an intermediate result number before rounding with a 128 bit mantissa. If the intermediate result is then rounded to single precision format, the 128 bit mantissa would have to be rounded to 24 bits. Thereafter, the most significant 24 bits of the normalized mantissa will participate in the destination result. The least significant bits of the normalized intermediate result that are not participating in the final result are used to compute the Guard, Round and Sticky bits. These three bits, along with other information such as the rounding mode, determined by the particular instruction or controls from a control register, will be used to decide whether the most significant 24 bits of the intermediate result will be rounded up by incrementing the binary register.

In conventional implementations, the normalized product will have at least "n" number of bits where n represents the number of mantissa bits in the highest precision supported by the processor. For example, if the highest precision of the processor supports double-extended precision where the number of mantissa bits in this precision range is 64, the normalized result will have at least 64 bits. If the intermediate result is then rounded to the lower precision, in this case single or double, the least significant "n-m" bits of the normalized number will participate in the Guard, Round and Sticky bit generation, where "m" is the number of mantissa bits in the destination format. Once the Guard, Round and Sticky bits are generated, these lower significant n-m bits will be made zeroes by use of a check unit prior to the rounding unit. For example, if the intermediate result is rounded to single precision where the number of mantissa bits is 24, the least significant 40 bits (64−24=40 bits, hence bits 0–39), will be used to generate the Guard, Round and Sticky bits. These 40 bits in the normalization output will be made zeroes before the mantissa is sent to the rounding unit. Similarly, if the intermediate result is rounded to double precision where the number of bits in that range is 53, the least significant 11 bits (64−53=11 bits house bits 0–10), will be used to generate the Guard, Round and Sticky bits. If the intermediate result is rounded to double-extended precision, by definition all bits of the 64 bit mantissa participate in the final result and none are converted to zeroes.

The rounding hardware requires logic circuitry to determine whether the intermediate result is to be incremented or not incremented and also an incrementer to perform the incrementation. For the incrementation function, a special incrementer is required that is slow, complex and requires extensive logical hardware.

In order to accommodate single precision, double precision and double-extended precision, the conventional rounding unit incrementer requires the ability to increment the intermediate result at three different positions. This incrementer will be in the critical path of the intermediate result. At each of these locations, the incrementer must evaluate a logic that is located at the junction of each portion of the incrementer. Further details of a conventional incrementer are set forth in the detailed description below.

Therefore, there presently exists a great need in the data processing industry for an apparatus that will perform variable precision floating point rounding operations that is simple, fast and requires minimal hardware. As will be seen, the present invention solves the problems of the prior art in a simple and elegant manner.

SUMMARY OF THE INVENTION

The rounding unit of the present invention allows for incrementing of a given number regardless of the degree of precision required by the instruction. The (FPU) floating point unit includes a check unit that is configured to receive a number from preceding floating point hardware that has significant bits determined by the precision indicated by a corresponding instruction or a control register. The check unit determines which precision is required and converts all bits to the right of the significant bits to logic 1's. This is unlike the prior art that converted them to zeroes. Further included is rounding control circuitry communicating with the preceding floating point hardware and the check unit for determining whether to increment the final result. The embodiment also includes two hardware units that receive the number from the check unit. The two units are an incrementer and a zero-out unit.

In one embodiment, the incrementer that receives the intermediate result from the check unit and increments the binary register by adding a logic 1 to the rightmost zero (only at one place) position of the input number. This 1 is added at the same location for single, double and double extended precisions. When this 1 is added, the series of 1s placed in the binary register in the lower significant bits are converted to zeroes by operation of the carrying of the 1 bit continuously adding from the right to the left. This operation ripples the carry to the rightmost higher significant bit to increment the resultant mantissa. The result is therefore an incremented number at the chosen precision with a series of trailing zeroes to the right of the rightmost significant bit. The mantissa is then passed on for further operation.

In the event that incrementing of the number is not required, the rounding unit in one embodiment further includes a zero-out unit that receives the intermediate result from the check unit and selectively converts the lower significant bits to logic zeroes before the number is passed on for further operation. The zero-out unit will convert the rightmost 40 bits of result from the check unit for a single precision result, the rightmost 11 bits for a double precision result and 0 bits for a double extended precision result. This is determined by the check unit interpreting the destination precision.

One embodiment further includes a 2-1 multiplexer bank configured to receive a first intermediate result from the incrementer and a second intermediate result from the zero out-unit. In response to a rounding decision from the rounding control circuitry, the multiplexer chooses which intermediate result to send as the final result. This zero-out unit,

3 although it adds additional hardware, it is out of the critical path of the number path. In conventional practice, the three piece incrementers having three separate incrementers slows down the incrementation process. Note that the incrementer is in direct critical path of the number path in conventional systems. This greatly slows down the operation.

Accordingly, a rounding unit is provided that is faster and less complex than conventional systems and speeds up the critical path of the number path.

DETAILED DESCRIPTION OF THE PREFERRED EMBODIMENT

Figure 1:
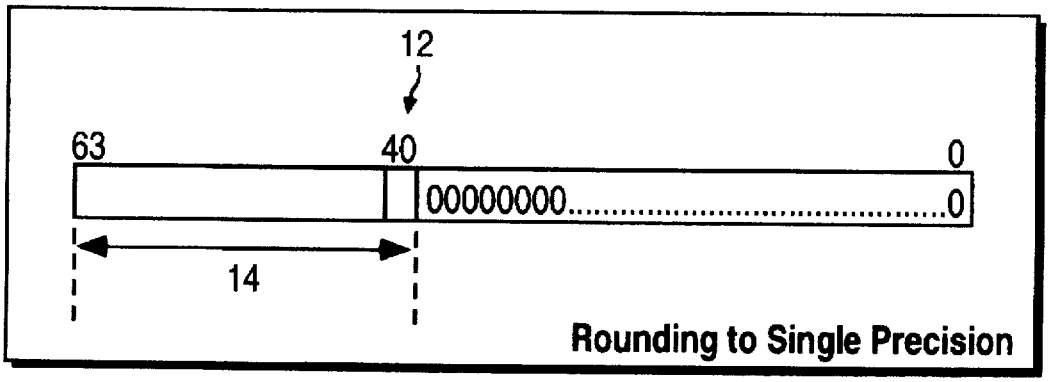
FIG. 1 is a general block diagram of a conventional rounding unit incrementer found in the Prior Art.
Figure 4:
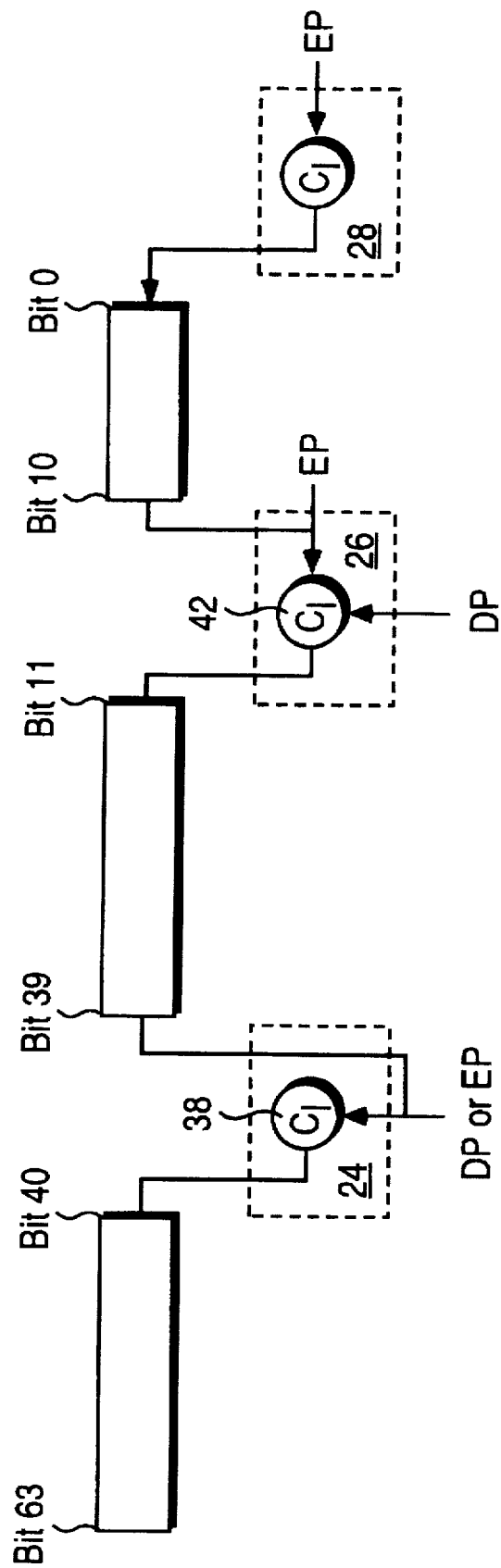
FIG. 4 is a general block diagram of a conventional rounding unit incrementer found in the Prior Art including intermediate logic hardware used for incrementing a number.
Figure 5:
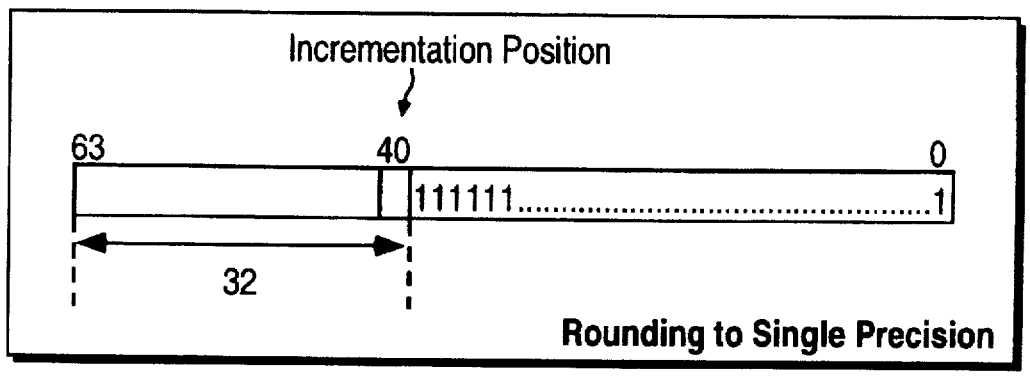
FIG. 5 is a general block diagram of a rounding unit incrementer in accordance with one embodiment of the present invention.
Figure 6:
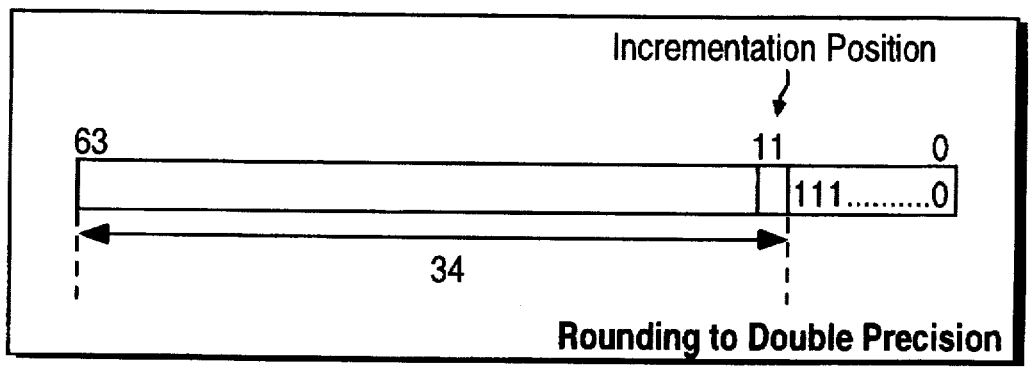
FIG. 6 is a general block diagram of a rounding unit incrementer in accordance with one embodiment of the present invention.
Figure 7:
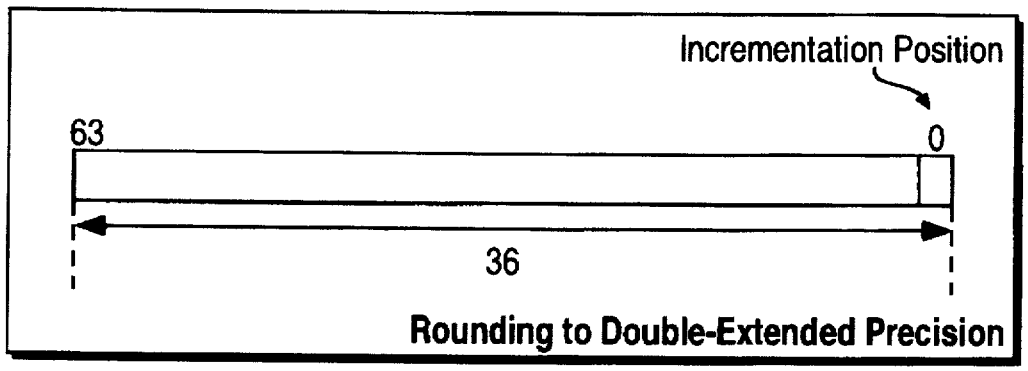
FIG. 7 is a general block diagram of a rounding unit incrementer in accordance with one embodiment of the present invention.

FIGS. 1 and 4 disclose rounding units of the prior art. FIGS. 5 through 7 of the drawings disclose various embodiments of the present invention for purposes of illustration. One skilled in the art will recognize alternative embodiments that may be employed without departing from the principles of the invention that are illustrated by the structures and methods described herein.

In order to fully understand the present invention, an understanding of how conventional systems operate is required. In a conventional implementation, as discussed in the background, the normalized result will have at least n bits where n represents the number of mantissa bits in the highest precision supported by the processor. For example, if the highest precision of the processor supports double extended precision with a range of 64 bits, the normalization output will have at least 64 bits. If the result is to be rounded to a lower precision, the least significant n–m bits of the normalized number will participate in the Guard, Round and Sticky bit generation where m is the number of mantissa bits in the destination format defining the precision of the destination device. The system encounters complications when the normalized number is rounded to double precision or single precision, and the number needs to be incremented. In conventional operations, the rounding unit has a separate incrementer at three different positions of the register of the incrementer. Referring to FIG. 1, the register 10 has 64 bits ranging from the zero position to the 63rd position, which is typical of conventional registers used in the rounding unit. FIG. 1 illustrates the single incrementing position 12 that

4 increments at bit 40 to increment the single precision results 14. Special logic hardware is required to increment at this position of the shifter. As shown in FIG. 4, the single precision hardware 24 is shown between the 40th and 39th bit of the shifter and includes a circuit 38 to determine the carry into single precision portion. This hardware is directly in the critical path of the incrementer. The conventional incrementer, as shown in FIG. 4, is divided up into three segments, the first segment having 24 bits, the second segment having 29 bits and the third segment having 11 bits.

Figure 2:
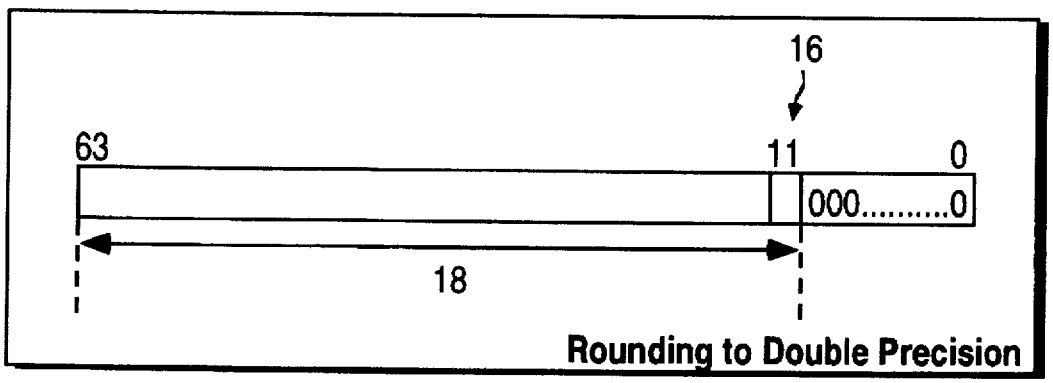
FIG. 2 is a general block diagram of a conventional rounding unit incrementer found in the prior art.

Referring now to FIG. 2, it can be seen that the double precision results 18 needs to be incremented at the incrementation position 16 located at bit position 11 in order to properly increment the number. However, this also requires the double precision hardware 26 shown in FIG. 4, including circuit 42 to determine the carry into double precision portion, which is in the critical path of the shifter. Incrementing a number in double precision also requires incrementing through the single precision hardware 24.

Figure 3:
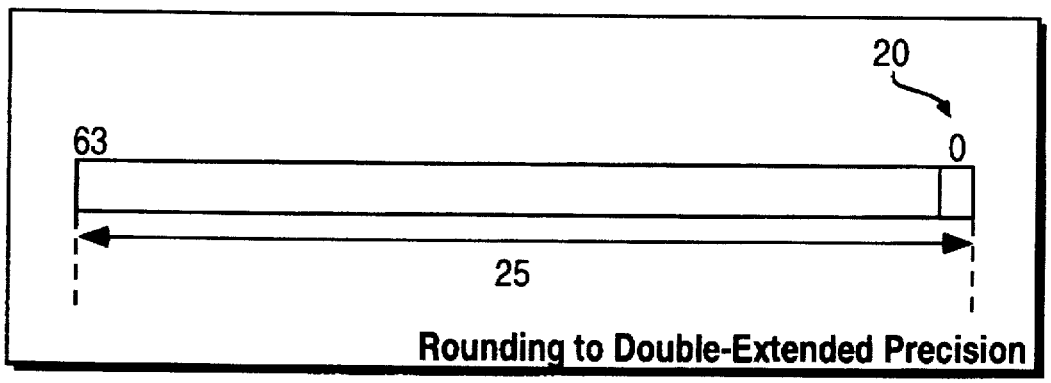
FIG. 3 is a general block diagram of a conventional rounding unit incrementer found in the prior art.

The double extended precision result 25 is shown in FIG. 3. In this case, the incrementation position 20 is at the zero position of the shifter. This requires separate incrementation at the zero position, which would go through the extended double precision hardware 28, the eleventh position which would go through the double precision hardware 26, as well as the fortieth position which must go through the single precision hardware 24.

Thus, when incrementation of the number is required, the incrementing process is complicated and can be very slow. Furthermore, additional hardware is required to increment the number at these different positions for the various precision ranges. The present invention provides for a very simple and elegant alternative to this incrementation and rounding process.

As shown in FIG. 5, the incrementation positions are the same as the conventional rounding unit, however, the intervening hardware 24, 26, 28 shown in FIG. 4 is not required for the present invention. All that is needed is a single uniform incrementer 50, as shown in FIG 8.

Unlike the conventional system, the present invention requires that the unused bit positions to the right of the results, determined by the precision range, are converted to logic 1s as opposed to zeroes. The check unit 42 shown in FIG. 8 is the same as the prior art except the new check unit is configured to send the result to the incrementer 50 to convert the lower bits to 1's instead of 0's. This goes for the single precision result 32 of FIG. 5 and the double precision result 34 of FIG. 6. By definition, the double extended precision result 36 does not require the ones to be converted since it occupies the entire 64 bits of the register.

Figure 8:
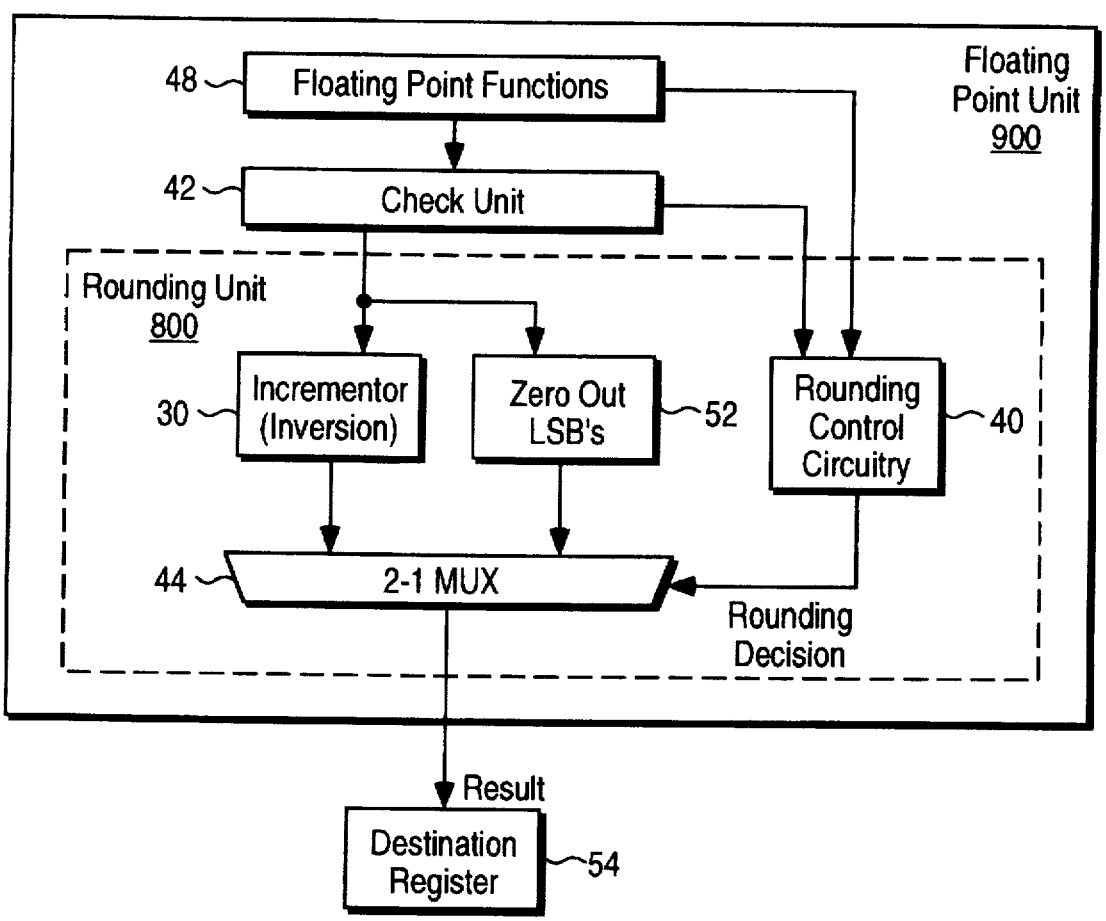
FIG. 8 is a general block diagram of a rounding unit incrementer in accordance with one embodiment of the present invention.

As shown in FIG. 8, the rounding unit 800 generally is located within the floating point unit 800. A rounding control circuit 40 controls the functions of the rounding unit. In operation, a number is processed in the floating point unit 800 in floating point functions 48 which perform various mathematical functions with input numbers. The intermediate result is then sent to the check unit 42 followed by the rounding unit 800 for rounding to a predetermined precision. The check unit 42 receives the intermediate result first to determine whether it is to be rounded to single, double or double extended precision. The check unit then defines the significant bits in response to the precision, uses the least significant bits not participating in the final result to compute Round, Guard and Sticky bits and converts the bits located to the right of the significant bits to logic ones and passes the result to the incrementer 50 and the zero-out unit 52. So, for example, if the precision of a destination register is single precision, the check unit 42 will convert the rightmost 40 bits to logic 1's, if it is double precision, the check unit 42 will convert the rightmost 11 bits to logic 1's and if it is double extended precision, the check unit will by definition not convert any bits.

The incrementer 50 adds a logic 1 to the zero position bit in every instance. So, for example, if a number is to be rounded to single precision, all of the bits from the zero position up to and including the fortieth position of the incrementer register are converted to logic 1's by the check unit. To increment the number, a logic 1 is added to the zero position in the register of the incrementer 50. The one is carried from the zero position through each position, up to the incrementation position or the least significant bit of the result where the single precision result is incremented. This results in an incremented single precision result with a series of trailing zeroes from the least significant bit of the result to the zero position bit. The zero-out unit 52 also receives the intermediate result and converts the bits located to the right of the significant bits to zeroes.

Similarly, in a double precision result situation, ones are inserted from zero position up to and including the tenth bit position in the check unit after the Guard, Round and Sticky bits have been generated using these eleven bits. Just like the single precision result above, the double precision result is sent to the incrementer 50 and the zero-out unit 52. Thereafter, a 1 is added to the zero position of the register of incrementer 50, which ripples down the series of ones up to the incrementation position, i.e. the least significant bit of the double precision result. Also, after the zero-out unit 52 receives the double precision result and converts the bits located to the right of the least significant bit to zeroes.

In the case of the double extended precision result, if the number is required to be incremented, a 1 is simply added at the zero position of the incrementer 50 to increment the number at that position. The value at the zero-out unit proceeds unchanged. Thus, the incrementer of the present invention works for all three cases and does not require any intervening hardware.

Once the incrementer and the zero-out unit have their values, the 2-1 multiplexer 44 chooses which value to output as the final result of the rounding unit 800 to the destination register 54 in response to the rounding control circuitry 40. Thus, if the rounding control circuitry requires the final result to be incremented, the multiplexer 44 chooses and outputs the result from the incrementer 50. If the rounding control circuitry 40 requires that the result not be incremented, it chooses and outputs the result from the zero-out unit 52.

From the above description, it will be apparent that the invention disclosed herein provides a novel and advantageous apparatus and method for performing variable precision floating point rounding operations. As will be understood by those familiar with the art, the invention may be embodied in other specific forms without departing from its spirit or essential characteristics, and thus, the described embodiment is not restrictive of the scope of the invention. The following claims are indicative of the scope of the invention, and all variations which come within the meaning and range of equivalency of the claims are to be embraced within their scope.

What is claimed is:

1. In a floating point unit (FPU) comprising:
   an arithmetic circuit configured to perform arithmetic functions;
   rounding control circuitry configured to control rounding functions;
   a check unit configured to receive a number from the arithmetic circuit to determine the precision of the number and define which bits are significant bits, to convert bits located to the right of the significant bits to logic ones and to output an intermediate result;
   a rounding unit including:
      an incrementer unit configured to receive the data from the check unit and incrementing it by adding a logic 1 to the zero position of the number producing a first output;
      a zero-out unit configured to receive the data from the check unit and convert the bits located to the right of the significant bits to logic zeroes producing the second output; and
      a multiplexer configured to selectively output a result from the incrementer or the zero-out unit.

2. A floating point unit according to claim 1 wherein the check unit determines whether the number is single, double or double extended precision in response to an instruction.

3. A floating point unit according to claim 1 or 2 wherein the incrementer is a single uniform binary incrementer.

4. A floating point unit according to claim 3 wherein the incrementer is a predetermined length and wherein the multiplexer is a 2-1 multiplexer that selects between the first output and the second output for a final output.

5. A floating point unit according to claim 3 wherein the incrementer is a 64-bit incrementer and the zero-out unit is configured to convert the forty rightmost bits of a number to logic zeroes if the precision range is single precision, to convert the eleven rightmost bits of a number if the precision range is double precision and to convert none of the bits if the precision range is double extended precision.

6. A floating point unit according to claim 1, wherein the multiplexer is controlled by the rounding control circuitry.

7. A floating point unit according to claim 1 or 2 wherein the precision of the number used for defining the significant bits of the number is determined by an instruction asserted to the floating point unit.

8. A floating point unit according to claim 1 or 2 wherein the precision of the number used for defining the significant bits of the number is determined by an control register asserted to the floating point unit.

9. A floating point unit according to claim 1 wherein the floating point unit is configured to produce Round, Guard and Sticky bits such that the bits located to the right of the significant bits defined by the check unit participate in generating the round, guard and sticky bits.

10. A floating point unit according to claim 1 or 2 wherein the arithmetic circuit is configured to output a 64 bit number and wherein the check unit is configured to output Round, Guard and Sticky bits, and wherein the rounding control circuitry is configured to determine rounding decision in response to the sign of the final output, the rounding mode specified by an instruction, the least significant bit of the mantissa before rounding and the Guard, Round, and Sticky bits.

11. In a floating point unit configured to produce round, guard and sticky bits, a check unit coupled to a rounding unit, the rounding unit having rounding control circuitry configured to control rounding operations, a first unit coupled to the check unit and configured to increment a number and a second unit coupled to the check unit and configured to zero-out least significant bits, a method of rounding a number to a predetermined range of precision comprising:

receiving a number;

defining the significant bits of the number in response to a predetermined precision range in the check unit;

converting each bit located to the right of the significant bits to logic 1 in the check unit;

incrementing the number in the rounding unit by adding a logic one to the rightmost bit of the number if the number requires incrementing; and converting the bits in the rounding unit located to the right of the significant bits to zero if the number does not require incrementing.

12. The method according to claim 11, wherein defining the significant bits includes:

determining the precision range of the input number in response to an instruction; and defining the significant bits in response to the precision range.

13. The method according to claim 12, wherein defining the significant bits includes determining whether the result is single, double or double extended precision and wherein the first unit outputs a first output to the multiplexer, the second unit outputs a second output to the multiplexer, and the multiplexer chooses between the first output and the second output in response to the rounding control circuitry.

14. The method according to claims 12 or 13, wherein:

adding a logic 1 to the rightmost bit to the input to first unit causes the series of ones located in the positions to the right of the significant bits to add and carry a logic 1 from the rightmost bit in the number to the rightmost significant bit while leaving logic zeros in their place.

15. The method according to claims 11, 12 or 13 wherein converting the bits located to the right of the significant bits to zero includes:

converting the bits to the right of the significant bits to zero in the second unit.

16. A recording unit configured to round a number to a predetermined precision and outputting a final result, the number having a mantissa and an exponent comprising:

checking means for defining the significant bits of a number and for converting the bits to the right of the significant bits to logic 1s;

incrementing means for receiving the number from the checking means and incrementing the number;

converting means for selectively converting the bits to the right of the significant bits to logic zeroes if the number does not require incrementing.

17. A rounding unit according to claim 16 further comprising multiplexing means for receiving an output from the incrementing means and an output from the converting means and controlling means for controlling the multiplexing means to cause the multiplexing means to output one of the outputs.

18. A rounding unit according to claims 16 or 17 wherein the incrementing means is a single uniform binary register.

19. A rounding unit according to claims 16 or 17 wherein the converting means communicates with a predetermined number of lowermost bits of the number for selectively converting the lower bits of the binary number to zeroes.

20. A rounding unit according to claim 16 wherein the device further includes means for producing Guard, Round and Sticky bits and wherein the decision whether to increment the number is determined in response to the sign of the final output, the rounding mode specified by an instruction, the least significant bit of the mantissa before rounding and the Ground, Round and Sticky bits.

* * * * *